Patented Oct. 21, 1941

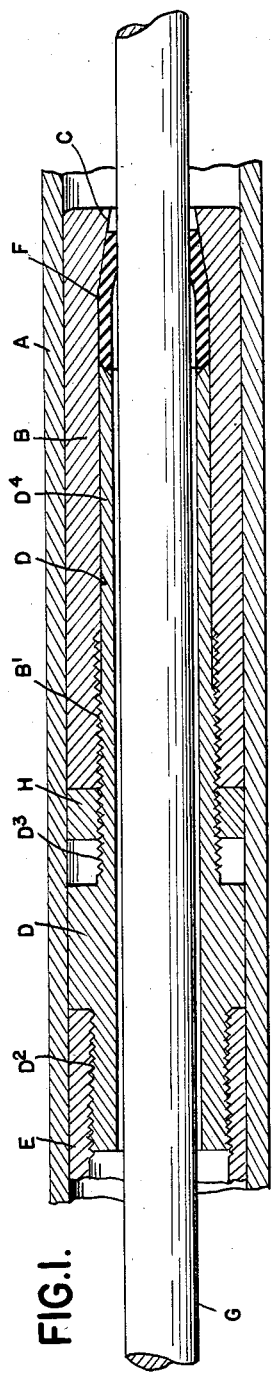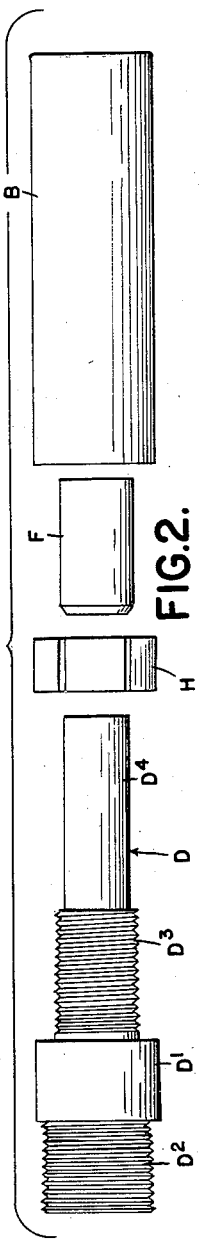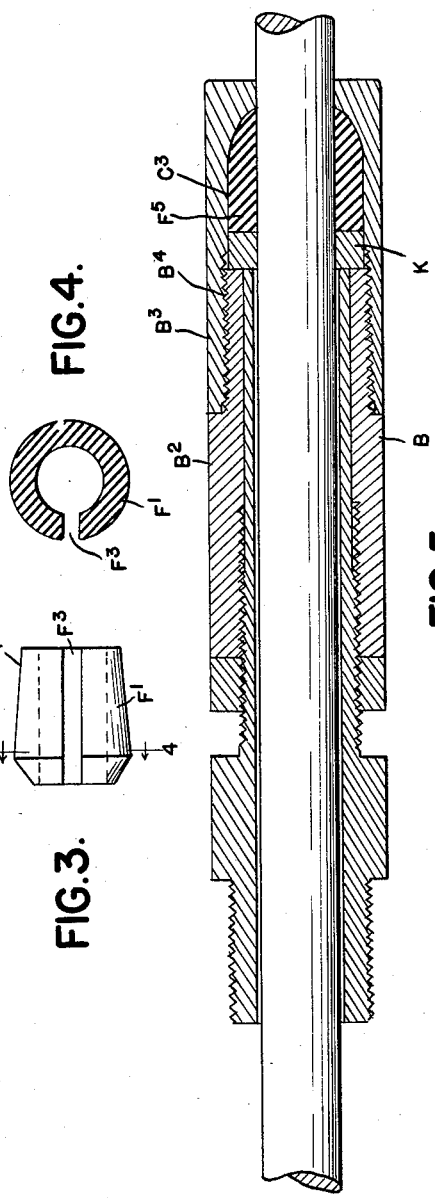

2,259,605

UNITED STATES PATENT OFFICE 2,259,605

STOCK FEEDER FOR HOLLOW SPINDLE MACHINE TOOLS

Samuel Baxendale, Dearborn, Mich., assignor to Modern Collet & Machine Company, Ecorse, Mich., a corporation of Michigan Application January 2, 1940, Serial No. 312,140

4 Claims. (Cl. 29—62)

The invention relates to hollow spindle machine tools of that type in which the stock is fed axially through the hollow spindle into engagement with the collet which clamps the same during the performance of the work. For the manufacture of certain articles the stock bars have a finished external surface and it is, therefore, desirable to avoid marring of this surface during the feeding of the stock through the spindle. It is the object of the instant invention to obtain a construction of feeder which will successively advance the stock without any injury of the surface thereof, and to this end the invention consists in the construction as hereinafter set forth.

In the drawing:

Figure 1 is a central longitudinal section through my improved feeder showing the same in engagement with the hollow spindle;

Figure 2 is a side elevation showing the parts of the feeder detached.

Figure 3 is a longitudinal section through a modified form of bushing;

Figure 4 is a cross section on the line 4—4 of Figure 3;

Figure 5 is a longitudinal section of a slightly modified construction.

As illustrated, A represents a hollow spindle through which the stock is to be fed. B is a tubular member slidably fitting within the spindle A and formed at its forward end with a conically contracted portion C. D is a tubular member having a portion D' for slidably fitting within the spindle A, a rearwardly extending portion $D^2$ of smaller external diameter threaded for engagement with a pusher tube E, a forwardly extending threaded portion $D^3$ of smaller diameter adapted to engage an internally threaded portion B' at the rear end of the member B, and a forwardly extending shank portion $D^4$ of still smaller external diameter fitting within the member B. F is a bushing of resilient deformable material such as rubber, which is of an external diameter to fit within the member B and an internal diameter for engaging the stock bar, such as G.

The parts constructed as described are assembled by first placing the bushing F inside the member B, then inserting the portion $D^4$ of the member D into the member B and in screwing the portion $D^3$ into the threaded portion D' until the forward end of the portion $D^4$ contacts with the rear end of the bushing F. A locknut H also threadedly engaging the portion $D^3$ may be used for holding the parts in adjusted position. The internal diameter of the bushing F is originally such as to just receive the stock bar but during the assembly of the parts the pressure of the portion $D^4$ against the end of the bushing will force the latter forward into the conical portion C which will contract it in diameter so that it will frictionally engage the stock bar. By suitable adjustment the pressure exerted by the bushing on the bar, will produce sufficient friction to advance the bar with the feeder in its forward direction, while during the return movement of the feeder the bar will be held by the collet (not shown) and the bushing will slide over the surface thereof. Because of the character of the material of which the bushing is formed, there will be no marring or scratching of the surface of the bar during this rearward movement. The sliding contact between the surface of the stock bar and the bushing will in time wear the latter so as to reduce the friction between the same and the bar. When this occurs all that is necessary is to release the locknut H and screw the threaded portion B' forward. This, through the portion $D^4$, will move the bushing F to further contract the same within the conical portion C and to thereby increase the friction upon the stock bar. Such adjustment may be made from time to time whenever necessary, and in this way the bushing will have an exceedingly long life.

The construction is one which may be used for feeding stock bars of different diameters by merely exchanging bushings for one of a suitable size.

Figures 3 and 4 illustrate a modified form of resilient bushing F'. In this form the bushing is slightly tapered at $F^a$ corresponding somewhat to the tapered portion C of the body. The bushing is also longitudinally split at $F^3$. If desired, the bushing may have a plurality of annularly arranged slots in which case the slots extend only for a part of the length of the bushing.

In Figure 5 a slightly modified form of construction is shown wherein the tubular member B is made up of two parts $B^2$ and $B^3$, which are threadedly united at $B^4$. One of the advantages of this construction is that the recess $C^3$ for the resilient bushing may be of larger diameter than the inner diameter of the portion $B^2$, thereby permitting the use of a resilient bushing $F^5$ of increased thickness. This bushing may be readily inserted when the end portion $B^3$ is removed.

To facilitate the entrance of the stock into the resilient bushing, there is provided a guide ring K which is of slightly larger diameter than the stock and which by abutting against the resilient bushing retains the same in position and prevents the same from becoming displaced inwardly in such a way as to interfere with the entrance of the stock into the bushing.

What I claim as my invention is:

1. The combination with a hollow spindle, of stock bar feeding means therein comprising a reciprocating tubular member inwardly tapering at its forward end, a rubber bushing within said member, and adjustable means for forcing said bushing axially against said inwardly tapering portion to contract the diameter of a portion thereof so as to frictionally engage said stock bar and to compensate for wear, the total volume of said bushing being less than the space within its length surrounding said stock bar.

2. The combination with a hollow spindle, of stock bar feeding means therein comprising a tubular member inwardly tapering at its forward end, a rubber bushing within said tubular member, a reciprocating tubular actuating member threadedly engaging the aforesaid tubular member to be axially adjustable in relation thereto and having a forwardly projecting portion engaging the rear end of said bushing to force the latter forward and to thereby contract the diameter of a portion thereof, the total volume of said bushing being less than the space within its length surrounding said stock bar, and means for locking said tubular members in adjusted positions.

3. The combination with a hollow spindle, of stock bar feeding means therein comprising a reciprocatory tubular member formed of two relatively axially adjustable sections forming an annular recess therebetween, a rubber bushing axially compressed by said sections within said recess to have a portion thereof contracted to an internal diameter less than the diameter of said stock bar, the total volume of said bushing being less than the space within said recess surrounding said stock bar.

4. The combination with a hollow spindle, of stock bar feeding means therein comprising two threadedly engaged tubular sections forming therebetween an annular recess surrounding said stock bar, a third tubular section telescopically arranged within one of the other sections and having a threaded engagement therewith for axial adjustment, locking means for holding said third section in adjusted position, a rubber bushing insertable within said recess upon the separation of said first mentioned threadedly engaged sections, and a guide ring and follower within said recess adjacent to said bushing, said ring being axially adjustable by said third section to axially compress said bushing and thereby contract the internal diameter thereof.

SAMUEL BAXENDALE.